US010545485B2

(12) United States Patent
Lisco et al.

(10) Patent No.: US 10,545,485 B2
(45) Date of Patent: Jan. 28, 2020

(54) METHOD FOR CONTROLLING A PLURALITY OF MACHINES, CONTROL SYSTEM AND DESCRIPTION

(71) Applicants: Marco Lisco, Bari (IT); Giulio Guaglianone, Bari (IT)

(72) Inventors: Marco Lisco, Bari (IT); Giulio Guaglianone, Bari (IT)

(73) Assignee: Nuovo Pignone S.P.A., Florence (IT)

(*) Notice: Subject to any disclaimer, the term of this patent is extended or adjusted under 35 U.S.C. 154(b) by 576 days.

(21) Appl. No.: 14/365,490

(22) PCT Filed: Dec. 7, 2012

(86) PCT No.: PCT/EP2012/074750
§ 371 (c)(1),
(2) Date: Jun. 13, 2014

(87) PCT Pub. No.: WO2013/087524
PCT Pub. Date: Jun. 20, 2013

(65) Prior Publication Data
US 2014/0350699 A1  Nov. 27, 2014

(30) Foreign Application Priority Data
Dec. 15, 2011 (IT) .............................. CO2011A0065

(51) Int. Cl.
*G05B 19/418* (2006.01)
(52) U.S. Cl.
CPC .... *G05B 19/418* (2013.01); *G05B 2219/1204* (2013.01)
(58) Field of Classification Search
CPC ............................................ G05B 2219/1204
(Continued)

(56) References Cited

U.S. PATENT DOCUMENTS 3,133,502 A   5/1964  Johnston
6,233,954 B1  5/2001  Mehaffey et al.
(Continued)

FOREIGN PATENT DOCUMENTS

CN   1201923 A   12/1998
CN   1453625 A   11/2003
(Continued)

OTHER PUBLICATIONS

European Office Action issued in connection with corresponding EP Application No. 12806385.6-1958 dated Nov. 18, 2015.
(Continued)

*Primary Examiner* — Emilio J Saavedra
(74) *Attorney, Agent, or Firm* — Baker Hughes Patent Organization (57) ABSTRACT

A method for controlling a plurality of machines and at least a first assembly; the plurality of machines comprises at least a first machine and a second machine; the first assembly is associated with the first and second machines and is arranged to provide a first auxiliary function to the first and second machines; control is carried out by at least a first and a second controllers; the first and the second controllers are associated respectively to the first and second machines and are arranged to control a main function of each of the first and the second machines; the first and the second controllers are associated with the first assembly and are arranged to control an auxiliary function of the first assembly; the first and the second controllers maintain a dialog between each other to assure that only one controller controls the first assembly at a time.

18 Claims, 7 Drawing Sheets

(58) Field of Classification Search
USPC .................................................. 700/19, 20
See application file for complete search history.

(56) References Cited

U.S. PATENT DOCUMENTS

| | | | | |
|---|---|---|---|---|
| 6,804,794 | B1* | 10/2004 | Robidoux | G06F 11/073 714/42 |
| 7,505,401 | B2* | 3/2009 | Kashyap | H04L 45/586 370/217 |
| 2003/0033056 | A1 | 2/2003 | Kusaka et al. | |
| 2003/0161731 | A1 | 8/2003 | Blotenberg | |
| 2003/0199995 | A1 | 10/2003 | Ishii et al. | |
| 2004/0107305 | A1* | 6/2004 | Bartlett | G06F 11/2089 710/36 |
| 2005/0193155 | A1* | 9/2005 | Fujita | G06F 13/364 710/111 |
| 2006/0230201 | A1 | 10/2006 | Fromherz | |
| 2008/0098401 | A1* | 4/2008 | Weatherhead | G06F 9/526 718/104 |
| 2011/0172788 | A1* | 7/2011 | Kilibarda | G05B 19/41815 700/9 |

FOREIGN PATENT DOCUMENTS

| | | | |
|---|---|---|---|
| EP | 1286289 A2 | 2/2003 | |
| EP | 2209055 A2 * | 7/2010 | ....... G05B 19/41865 |
| JP | 2003058207 A | 2/2003 | |

OTHER PUBLICATIONS

International Search Report and Written Opinion issued in connection with corresponding application PCT/EP2012/074750 dated Feb. 12, 2013.
Unofficial English translation of Chinese Office Action issued in connection with corresponding CN Application No. 201280061569.8 dated Jun. 22, 2016.

* cited by examiner

METHOD FOR CONTROLLING A PLURALITY OF MACHINES, CONTROL SYSTEM AND DESCRIPTION

TECHNICAL FIELD

Embodiments of the subject matter disclosed herein generally relate to a method for controlling a plurality of machines, a control system and a plant for treating and/or distributing oil or gas.

BACKGROUND ART

Many (almost all) systems need to be controlled.

When a system to be controlled comprises a plurality of machines, for example pumps, compressors, turbines, engines, two basic alternative approaches may be followed: centralized control or distributed control.

A centralized control system consists of a single controller controlling all of the machines; an example of centralized control system and method are disclosed in U.S. Pat. No. 3,133,502 where it is used for controlling a pump system comprising a plurality of pumps.

A distributed control consists of a plurality of controllers, typically one for each machine to be controlled.

U.S. Pat. No. 6,233,954 discloses a first distributed control system (considered as "prior art") comprising a plurality of "local" controllers associated to a corresponding plurality of compressors and a "host" controller; the host controller gets measurement values from a single supply line pressure sensor and accordingly instructs the local controllers how to behave (i.e. the specific control to be carried out).

U.S. Pat. No. 6,233,954 discloses a second distributed control system (considered as "invention") comprising a plurality of "local" controllers associated to a corresponding plurality of compressors; each local controller is connected to a discharge pressure sensor associated with the output of the respective compressor; the outputs of the compressors are connected to a single supply line; the control method comprises the steps of: designating one of the compressors as a highest ranked compressor, establishing a set point pressure threshold for loading and unloading each compressor, assigning a sequential ranking to said compressors beginning with the highest ranked compressor wherein the highest ranked compressor will initiate all commands for controlling all lower ranked compressors in the compression system, and repeating a loading subroutine until the discharge pressure of the highest ranked compressor is greater than the set point pressure threshold established therefor. Such a distributed control solution may be defined "hierarchic control" due to the ranking.

Another kind of distributed control solution is disclosed in patent application US 2003/0161731; a plurality of turbo engines cooperate in a station, and each turbo engine with the drive machine driving it forms a machine unit, with which a machine controller is associated; to control these turbo engines in parallel or tandem operation to observe at least one process variable, which is preset by the station and is common to all turbo engines, the preset, common process variable is set directly to each of the machine controllers, and this preset, common process variable is controlled exclusively via the machine controllers associated with the particular machine unit; there is no master controller; the total set point is sent, instead, to each of the machine controllers from a centralized set point presetter of the station directly via a signal line reaching all machine controllers; the actual value is likewise sent directly to each machine controller via a signal line, so that each machine controller can perform the necessary calculations on its own and can adjust the downstream control units just as if a common, higher-level master controller were used.

Figure 1:
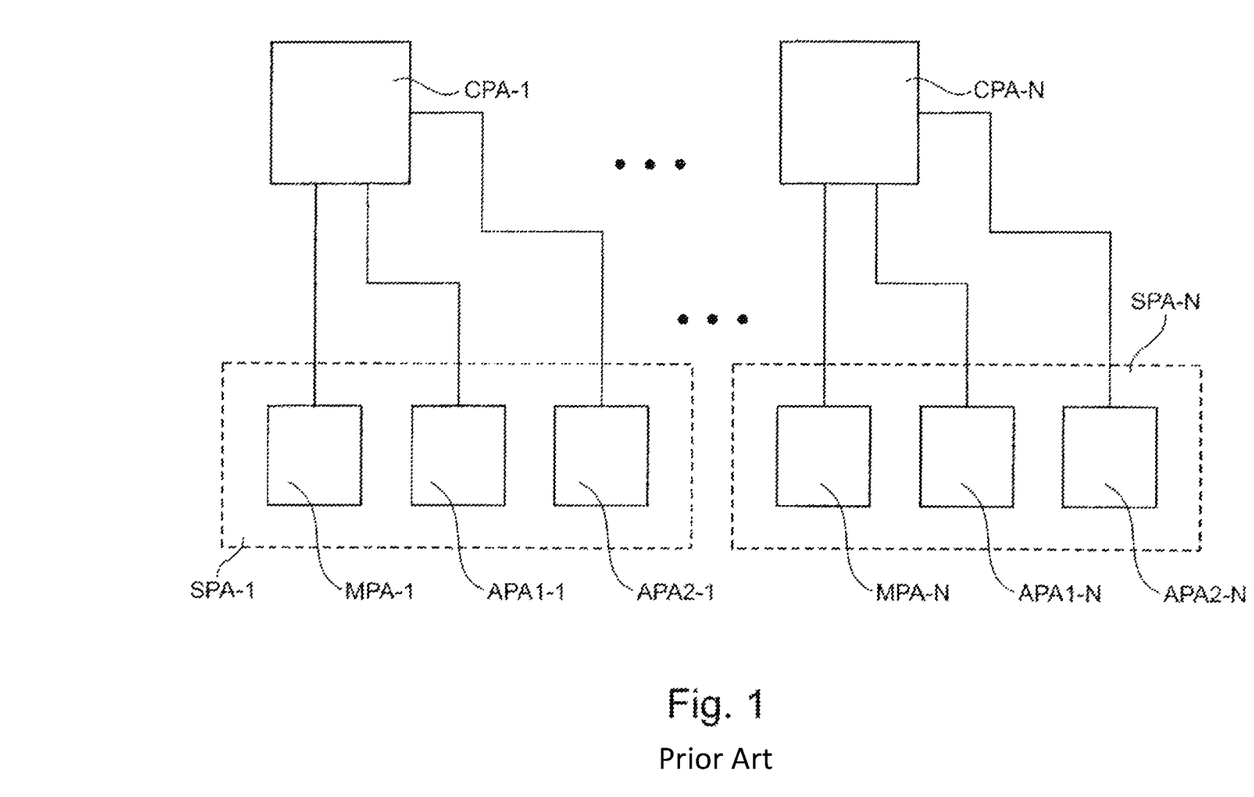
FIG. 1 shows a schematic block diagram of a distributed control system according to the prior art.

All the above described control systems and methods assume that each of the machines to be controlled is a single subsystem separate from each other; some of them, consider the possibility that there are one or more separate sensors used for controlling the machines. This is shown schematically in FIG. 1 wherein a set of N subsystems SPA-1 to SPA-N are controlled in a distributed way be a corresponding set of N controllers CPA-1 to CPA-N; each of the subsystems (SPA-1 to SPA-N) comprises a machine (MPA-1 to MPA-N) and a couple of auxiliary function assemblies (APA1-1 and APA2-1 for subsystem SPA-1 . . . APA1-N to APA2-N for subsystem SPA-N); for example the machines (MPA-1 to MPA-N) are pumps, the first auxiliary function assemblies (APA1-1 to APA1-N) are active lubrication equipments of the machines, the second auxiliary function assemblies (APA2-1 to APA2-N) are active sealing equipments of the machines; each of the controllers controls the machine and the auxiliary function assemblies of the corresponding subsystem.

SUMMARY

Anyway, when an auxiliary function assembly (that needs to be controlled), for example an active lubrication assembly or an active cooling assembly or an active sealing assembly, is associated to two or more separate machines (that need to controlled), i.e. it is shared by the machines, the above mentioned distributed control solutions are not applicable.

In this case, each of the machines and assemblies may be considered a separate subsystem to be controlled; anyway, the subsystems have relations constraints between each other.

A first aspect of the present invention is a method for controlling a plurality of machines and at least a first assembly.

According to an embodiment thereof, said plurality comprises at least a first machine and a second machine, the first assembly is associated with said at least first and second machines and is arranged to provide a first auxiliary function (e.g. lubrication or seal) to said at least first and second machines, control is carried out by means of at least a first controller and a second controller, said at least first and second controllers are associated respectively to said at least first and second machines and are arranged to control said at least first and second machines as far as a main function is concerned, said at least first and second controllers are associated with said first assembly and are arranged to control said first assembly as far as a first auxiliary function is concerned, said at least first and second controllers maintain a dialog between each other so to assure that only one controller controls said first assembly at a time.

Said dialog advantageously provides that any of the controllers knows which controller is currently controlling said at least a first assembly.

In case of emergency, any of said at least first and second controllers may issue control commands to said first assembly irrespectively from which of said at least first and second controllers is currently controlling said first assembly.

Said at least first and second controllers may communicate directly between each other.

Said dialog may consist in an exchange of messages by means of handshaking.

Control over said first assembly may be represented by a "token" and wherein said at least first and second controllers exchange said "token".

Said at least first and second controllers may be associated indirectly with said first assembly for control thereof.

Said at least first and second controllers may be associated directly with a communication unit, and said communication unit may be associated directly with said first assembly, said communication unit being used for control of said first assembly by said at least first and second controllers.

Said communication unit may repeatedly receive measurement values from said first assembly.

Said communication unit advantageously provides one or more of said measurement values to any of said at least first and second controllers upon request.

Said communication unit may receive control commands for said first assembly from any of said at least first and second controllers and accordingly and forward said control commands for said first assembly to said first assembly.

Said communication unit may be used for maintaining the dialog between said at least first and second controllers.

A direct connection between said at least first and second controllers may be used for maintaining the dialog between said at least first and second controllers.

Said dialog may provide that any of the controllers knows the operating status of the other controllers (and therefore on the operating status of the other machine).

Said dialog may provide that a controller sends a request to obtain control over said first assembly to the other controller and waits for confirmation from the other controller before having control over said first assembly.

Said dialog may provide that a controller sends a request to release control over said first assembly to the other controller and waits for confirmation from the other controller before loosing control over said first assembly.

Messages (sent and/or received) of said dialog may depend on the operating status and/or the operating transition of said at least first and second controllers (and therefore on the operating status and/or the operating transition of said at least first and second machines).

The operating status of any of the controllers may comprise: "machine active", "machine inactive".

The operating transition of any of the controllers may comprise: "machine starting", "machine stopping".

It may be provided that control over said first assembly can be freely exchanged between controllers in the same operating status.

The machines of said plurality may be of the rotating type.
The machines of said plurality may be similar or identical.
The machines of said plurality may be pumps.

Said first assembly may be an active lubricating subsystem common to said at least first and second machine.

Said first assembly may be an active sealing subsystem common to said at least first and second machine.

The method may be so arranged to control further at least a second assembly, wherein the second assembly is associated to said at least first and second machines and is arranged to provide a second auxiliary function (e.g. lubrication or seal) to said at least first and second machines.

Said at least first and second controllers may behave in the same way with respect to said at least first and second assembly.

Control over said first and control over said second assembly may be exchanged between said at least first and second controllers at the same time.

A second aspect of the present invention is a control system for controlling a plurality of machines and at least a first assembly.

According to an embodiment thereof, said plurality comprises at least a first machine and a second machine, the first assembly is associated with said at least first and second machines and is arranged to provide a first auxiliary function (e.g. lubrication or seal) to said at least first and second machines, the control system comprises at least a first controller and a second controller, said at least first and second controllers is associated respectively to said at least first and second machines and are arranged to control said at least first and second machines as far as a main function is concerned, said at least first and second controllers are associated with said first assembly and are arranged to control said first assembly as far as a first auxiliary function is concerned, said at least first and second controllers are arranged to maintain a dialog between each other so to assure that only one controller controls said first assembly at a time.

The control system may be arranged to control further at least a second assembly, wherein the second assembly is associated to said at least first and second machines and is arranged to provide a second auxiliary function to said at least first and second machines, wherein said at least first and second controllers are associated with said second assembly and are arranged to control said second assembly as far as a second auxiliary function is concerned, wherein said at least first and second controllers are arranged to maintain a dialog between each other so to assure that only one controller controls said second assembly at a time.

Said at least first and second controllers may be arranged to maintain a dialog between each other so to assure that only one controller controls said at least first and second assemblies at a time.

Said at least first and second controllers may be directly connected for maintaining said dialog between said at least first and second controllers.

The control system may comprise further a communication unit; in this case, said at least first and second controllers are associated directly with said communication unit and said communication unit is associated directly with said first assembly, and said communication unit is arranged for allowing control of said first assembly by said at least first and second controllers.

Said communication unit may be arranged for allowing said dialog between said at least first and second controllers.

Each of said controllers may comprise a memory arranged to store its operating status and/or its operating transition.

Each of said controllers may comprise a memory arranged to store the operating status and/or the operating transition of the other controllers.

In general, the control system may be arranged to implement the method as set out above.

A third aspect of the present invention is an oil or gas treating and/or distributing plant.

According to an embodiment thereof, the plant comprises a plurality of machines, at least a first assembly, and one control system, wherein said plurality comprises at least a first machine and a second machine, wherein the first assembly is associated with said at least first and second machines and is arranged to provide a first auxiliary function (e.g. lubrication or seal) to said at least first and second machines, wherein the control system comprises at least a first controller and a second controller, wherein said at least first and second controllers is associated respectively to said at least first and second machines and are arranged to control said at least first and second machines as far as a main function is concerned, wherein said at least first and second controllers are associated with said first assembly and are arranged to control said first assembly as far as a first auxiliary function is concerned, wherein said at least first and second controllers are arranged to maintain a dialog between each other so to assure that only one controller controls said first assembly at a time.

The plant may comprise a control system as set out above.

BRIEF DESCRIPTION OF DRAWINGS

The accompanying drawings, which are incorporated in and constitute a part of the specification, illustrate embodiments of the present invention and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a centrifugal compressor. However, the embodiments to be discussed next are not limited to this kind of system, but may be applied for example to axial compressors.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 2:
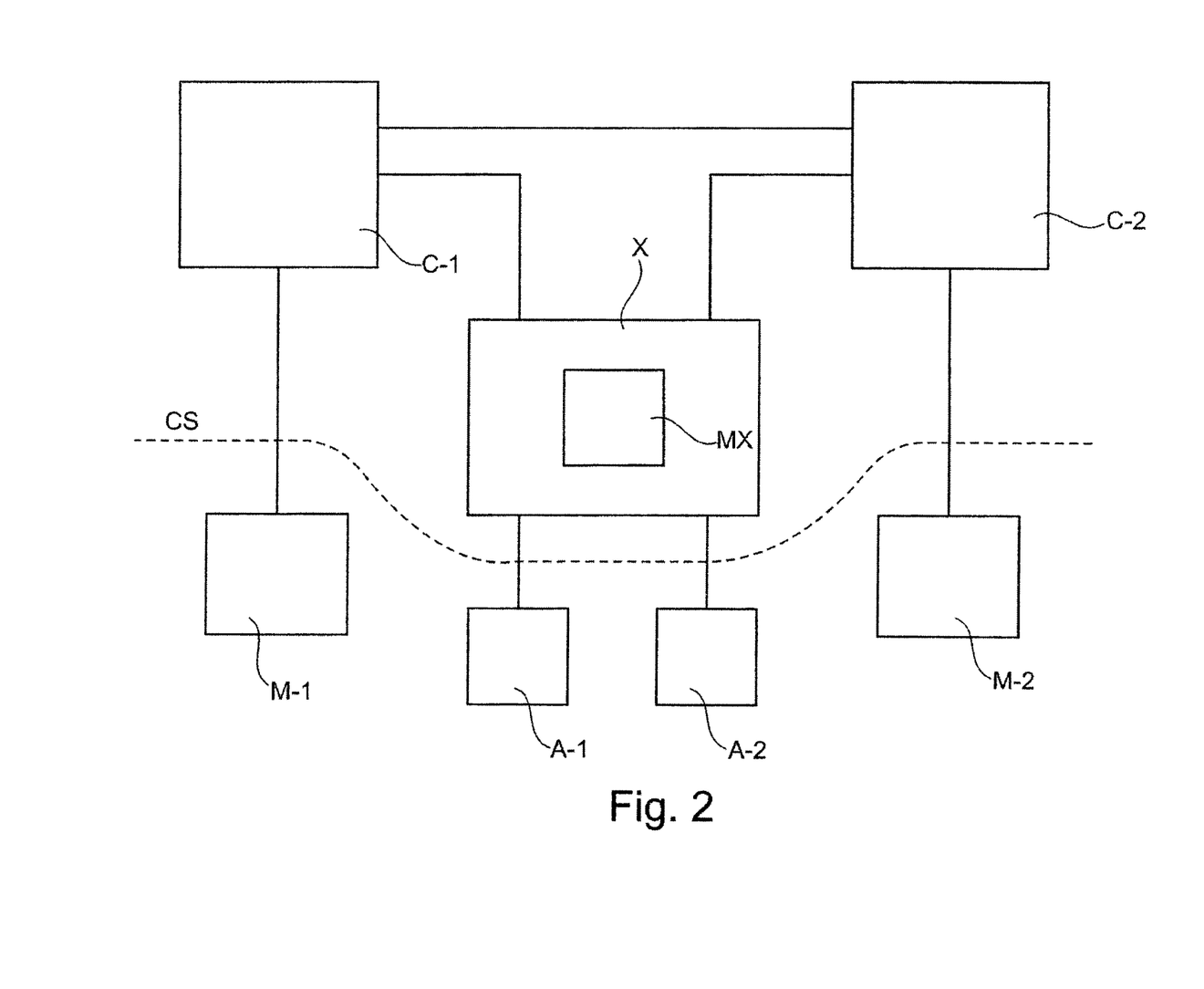
FIG. 2 shows a schematic block diagram of a distributed control system according to an embodiment of the present invention together with a controlled system.

In the embodiment of FIG. 2, the system to be controlled consists of four subsystems, two machines M-1 and M2 and two auxiliary function assemblies A-1 and A-2; for an easier understanding the reader may assume that machines M-1 and M-2 are identical centrifugal (rotary) pumps for pumping oil in a petrochemical plant, assembly A-1 is an active lubricating equipment common to machines M-1 and M-2 and providing a lubrication function to them, and assembly A-2 is an active sealing equipment common to machines M-1 and M-2 and providing a seal function to machines M-1 and M-2. Alternative embodiment of the present invention may provide for example that the machines are in a higher number (three, four, etc.) and/or that the assemblies are in a higher number (three, four, etc.) and/or that the machines are of another kind (compressors, turbines, engines, etc.) and/or that the assemblies are of another kind (active cooling subsystem, etc.). The fact that, in the embodiment of FIG. 2, the number of controllers is equal to the number of assemblies does not have any technical meaning.

The control system CS of the embodiment of FIG. 2 consists of two controllers C-1 and C-2, one for each of the two machines M-1 and M-2, and a single communication unit X for both controllers C-1 and C-2 and for both assemblies A-1 and A-2; alternatively, there may be a communication unit for each of the assemblies.

Controllers C-1 and C-2 are associated respectively to machines M-1 and M-2 and are arranged to control machines M-1 and M-2 as far as a main function is concerned; in the case of oil pumps, for example, the main function is to pump oil.

Controllers C-1 and C-2 are associated also with assemblies A-1 and A-2 and are arranged to control assembly A-1 as far as a first auxiliary function is concerned, for example lubricating (circulating lubrication liquid) both pumps, and assembly A-2 as far as a second auxiliary function is concerned, for example sealing (providing sealing gas or liquid to bearing) both pumps.

In order to assure that only one of controllers C-1 and C-2 controls assemblies A-1 and A-2 at a time, controllers C-1 and C-2 maintain a dialog between each other; this dialog provides that any of controllers C-1 and C-2 knows which controller is currently controlling assemblies A-1 and A-2.

While controllers C-1 and C-2 are associated directly with the respective machines M-1 and M-2 for control thereof, they are associated indirectly with assemblies A-1 and A-2 for control thereof; more specifically, controllers C-1 and C-2 are associated directly with communication unit X and communication unit X is associated directly with assemblies A-1 and A-2.

Communication unit X takes care only of communication function and therefore has only a passive role and no active role in controlling assemblies A-1 and A-2.

The arbitration on "control over the assemblies" is carried out directly by the controllers (i.e. C-1 and C-2 in FIG. 2). The model used for implementing this "self-arbitration" is based on one "token" that represents "control": only one of the controllers has the "token" (i.e. the control) at a time and may pass the "token" (i.e. the control) to another controller; any move of the "token" (i.e. the control) must be agreed/negotiated between the controllers; typically, agreement/negotiation is between two controllers (the one giving the "token" and the one receiving the "token") even if the number of controllers is higher.

Although, in principle, it might be possible that two different controllers control respectively two different assemblies at a time (for example controller C-1 controls e.g. assembly A-2 and controller C-2 controls e.g. assembly A-1) by providing one "token" for each of the assemblies, it is advantageous to provide only one "token" irrespectively from the number of assemblies to be controlled; therefore, when a controller has control, it controls all the assemblies.

In general, controlling a subsystem (i.e. a machine or an assembly) means receiving measurement values from sensors of the subsystem and transmitting control commands to actuators of the subsystems based on a predetermined control function and on the received measurement values.

As far as assemblies A-1 and A2 is concerned, subsystem control is done through communication unit X by any of the controllers, either controller C-1 or controller C-2, i.e. the controller currently having the "token".

In special situations, any of controllers C-1 and C-2 may issue control commands to assemblies A-1 and A-2 irrespectively from which of the controllers is currently controlling the assemblies, i.e. has the "token". Such situations are typically emergency situations. For example, if oil pressure in a lubrication assembly is below a predetermined threshold value, the first controller that detects this situation stops the oil circulating pump of the common assembly (irrespectively from the position of the token); in this case, it may be advantageously provided that this emergency situation is signaled by a controller to the other controller (e.g. through a field of a status register) and both controllers stop their corresponding controlled machine.

Figure 3:
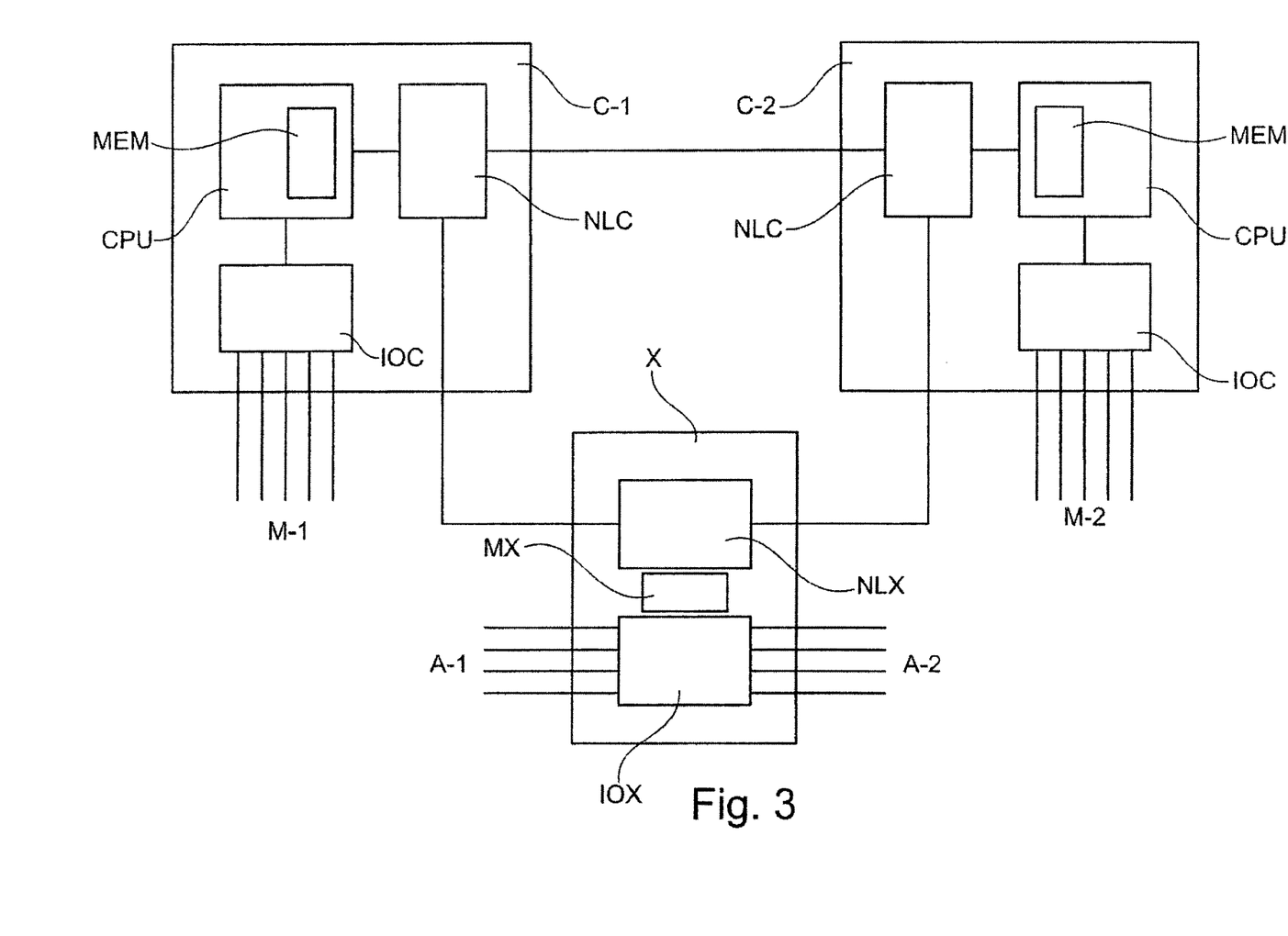
FIG. 3 shows a more detailed block diagram of the control system of FIG. 2.

The communication between controllers C-1 and C-2 is a direct communication and is used for the implementing the above mentioned dialog; this can be realized through a direct connection (as shown in FIG. 3) or through and indirect connection (as shown in FIG. 2 and FIG. 3); the indirect connection may be implemented by means of the communication unit X (as shown in FIG. 2 and FIG. 3). It is to be noted that, in general, it is advantageous to have both a direct and an indirect connection between the controllers (as shown in FIG. 2 and FIG. 3) so that in case one of them fails the other may be used. In order to implement a robust communication based on the exchange of messages between the various entities, handshaking is advantageously used. These connections are e.g. serial connections (for example RS-232, RS-422, RS-485, . . . ) or network connections (for example Ethernet).

Communication unit X repeatedly, for example periodically, receives measurement values from assemblies A1- and A-2; in the embodiment of FIG. 2, communication unit X stores all these values in an internal memory MX. Communication unit X may provide these values to controllers C-1 and C-2; in the embodiment of FIG. 2, communication unit X provides one or more of these measurement values to any of the controllers C-1 and C-2 upon its request; in other words, communication unit X provides measurement values irrespectively from which of the controllers is currently controlling the assemblies.

Communication unit X receives control commands for the assemblies A-1 and A-2 from any of controllers C-1 and C-2 and, in the embodiment of FIG. 2, accordingly forwards them to the destination assembly irrespectively from which of the controllers is currently controlling the assemblies; this is why it is important that controllers agrees/negotiates the "token" so that it is avoided that control commands in contrast between each other are received by an assembly.

Therefore, according to preferred embodiments of the present invention, the communication unit is used for controlling the assemblies by the controllers and for maintaining the dialog between the controllers.

Therefore, it may be said that, according to preferred embodiments of the present invention, the communication unit is "dumb".

According to the embodiment of FIG. 2 and FIG. 3, controllers C-1 and C-2 are identical and comprises a network interface NLC, an I/O (input/output) interface IOC and a processing unit CPU connected to the interfaces, and communication unit X comprises a network interface NLX, an I/O (input/output) interface IOX and a memory MX (provided with some control logic) connected to the interfaces. Interface IOC is used for connecting a controller with a machine; interface IOX is used for connecting the communication unit with the assemblies; interfaces NLC and NLX are used for connecting together the communication unit and the controllers. Memory MX is used for storing temporary data, such as control commands coming from controllers and going to assemblies, and permanent data, such as measurement values received from the assemblies and repeatedly updated. Memory MEM is used for storing programs of unit CPU, temporary processing data and permanent data, such as the operating status and the operating transition of the local controller or the operating status and the operating transition of all controllers, i.e. the local controller (for example controller C-1) and the remote controllers (for example controller C-2); it is to be noted that the operating status and the operating transition of a controller is at least partially related to the operating status and the operating transition of the corresponding machine.

The permanent data stored in memory MEM are very important for a correct operation of the control system and a coordinated operation of the controllers of the control system.

Such data may be organized as a data register comprising a plurality of data fields; in those advantageous embodiments wherein memory MEM locally stores data relating to all controllers, it is preferable to provide one register for each of the controllers. In order the have data in such registers in the controllers continuously updated, it is possible and advantageous to use a low-level HW/SW updating mechanism offered by some commercial processors: part of the internal memory of some connected processors is configured as "global data", and, any time one of the processors changes a piece of information in its memory within the "global data", the same change occurs in the memories within the "global data" of the other processors; this mechanism may be considered a part or the totality of the dialog between the controllers.

Unit CPU may be advantageously implemented by means of a PLC (Programmable Logic Controller); many recent commercial PLC offer the above mentioned low-level HW/SW updating mechanism.

A register (in the memory MEM of a controller) relating to a controller (the same controller or another controller) may contain the following fields (they may correspond to a single bit of information):

F1: "obtain control": is set if the controller wants to obtain control

F2: "release control": is set if the controller has control and wants to release control F3: "acknowledged": is set if a request to obtain/release control has been granted/accepted by another controller F4: "not-acknowledged": is set if a request to obtain/release control has not been granted/accepted by another controller F5: "machine active" (operating status): is set if the machine directly associated with the controller is operating or running F6: "machine inactive" (operating status): is set if the machine directly associated with the controller is not operating or running F7: "machine starting" (operating transition): is set if the machine directly associated with the controller is going to be started, i.e. changing from not-operating or not-running to operating or running F8: "machine stopping" (operating transition): is set if the machine directly associated with the controller is going to be stopped, i.e. changing from operating or running to not-operating or not-running F9: "control" or "token": is set if the controller is currently controlling the assemblies, i.e. has the "token"

It is to be noted, in different embodiments of the present inventions, there might be more or less fields than above and the fields may be different from above.

The information in fields F1, F2, F3, F4 and F9 is directly used for arbitration of the control between the controllers and during the corresponding dialog; the information in fields F5, F6, F7 and F8 is repeatedly, for example periodically, updated by each controller and is indirectly used for the arbitration.

According to the embodiment of FIG. 2 and FIG. 3, in the memory MEM of each of controllers C-1 and C-2 there are at least two registers as described above, one for controller C-1 and one for controller C-2.

Figure 4:
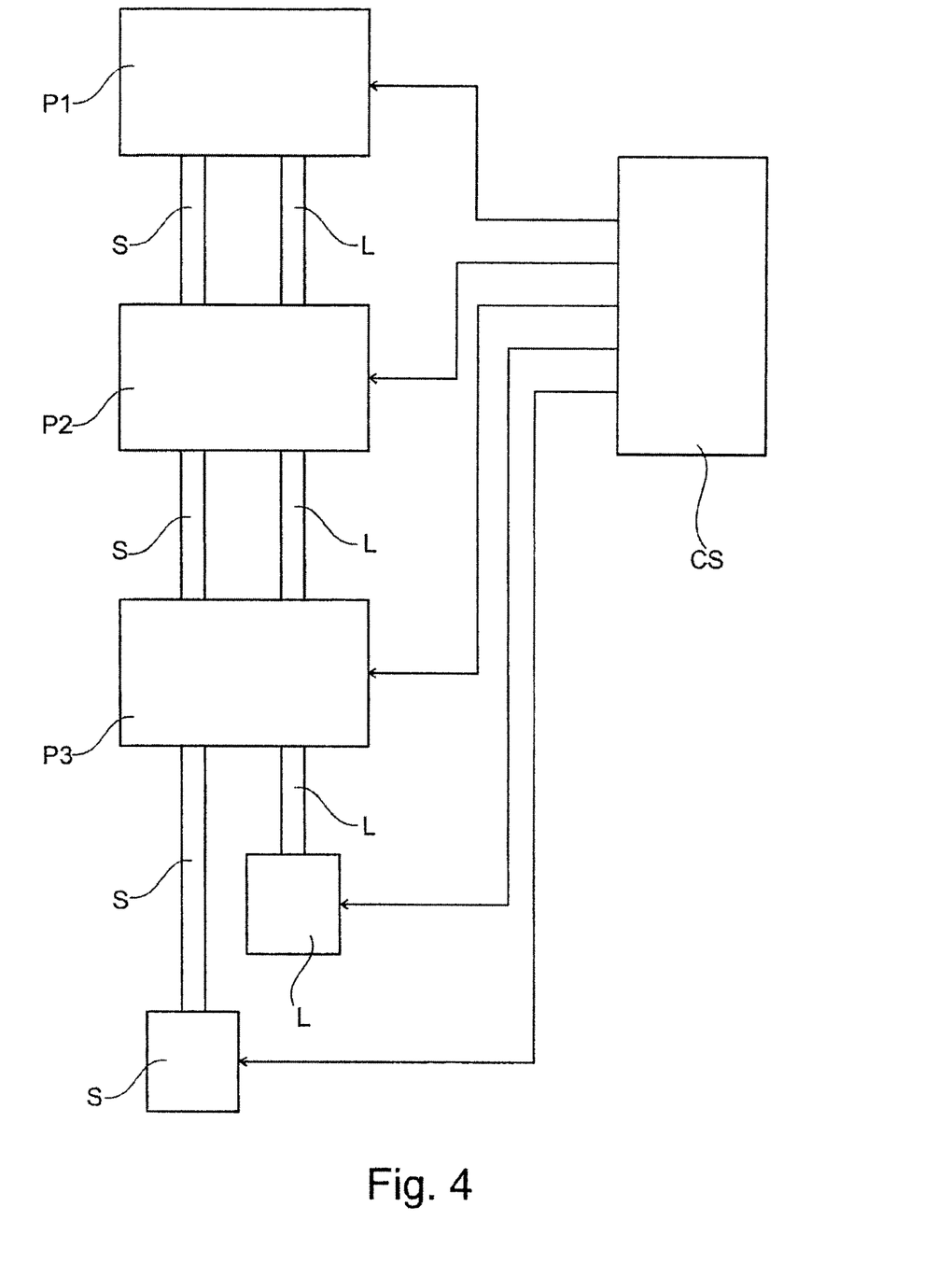
FIG. 4 shows a schematic block diagram of a plant according to a very simple embodiment of the present invention.

FIG. 4 shows, in a schematic and simplified way, an embodiment of a plant according to the present invention; the plant is a petrochemical plant and comprises three machines P1, P2, P3 for pumping oil having a common active lubrication assembly or subsystem L and a common active sealing assembly or subsystem S; a control system CS (according to the present invention) controls the pumps P1, P2 and P3 and the assemblies L and S; pumps P1, P2, P3 are identical centrifugal (rotary) pumps; no pipes going to and coming from the pumps are shown in the figure.

In this embodiment of FIG. 4, control system CS is similar to that of FIG. 2 and FIG. 3, the difference being that the machines are three instead of four.

A person skilled in the art understands now that many embodiments of the plant according to the present invention are possible being different from that of FIG. 4. For example, the plant may be a treating and/or distributing plant, the plant may be for oil or for gas, the machines may be less than three (for example two as in FIG. 2 and FIG. 3) or more than three, the assemblies may be less than two or more than two, the machines may be similar or quite different instead of being identical, the machines may be compressors or turbines or engines instead of pumps, the assemblies may be partially or totally of other kinds including e.g. an active cooling subsystem.

An embodiment of the control method according to the present invention used in the control system of FIG. 2 and FIG. 3 will now be described with help of FIG. 5, FIG. 6 and FIG. 7.

Figure 5:
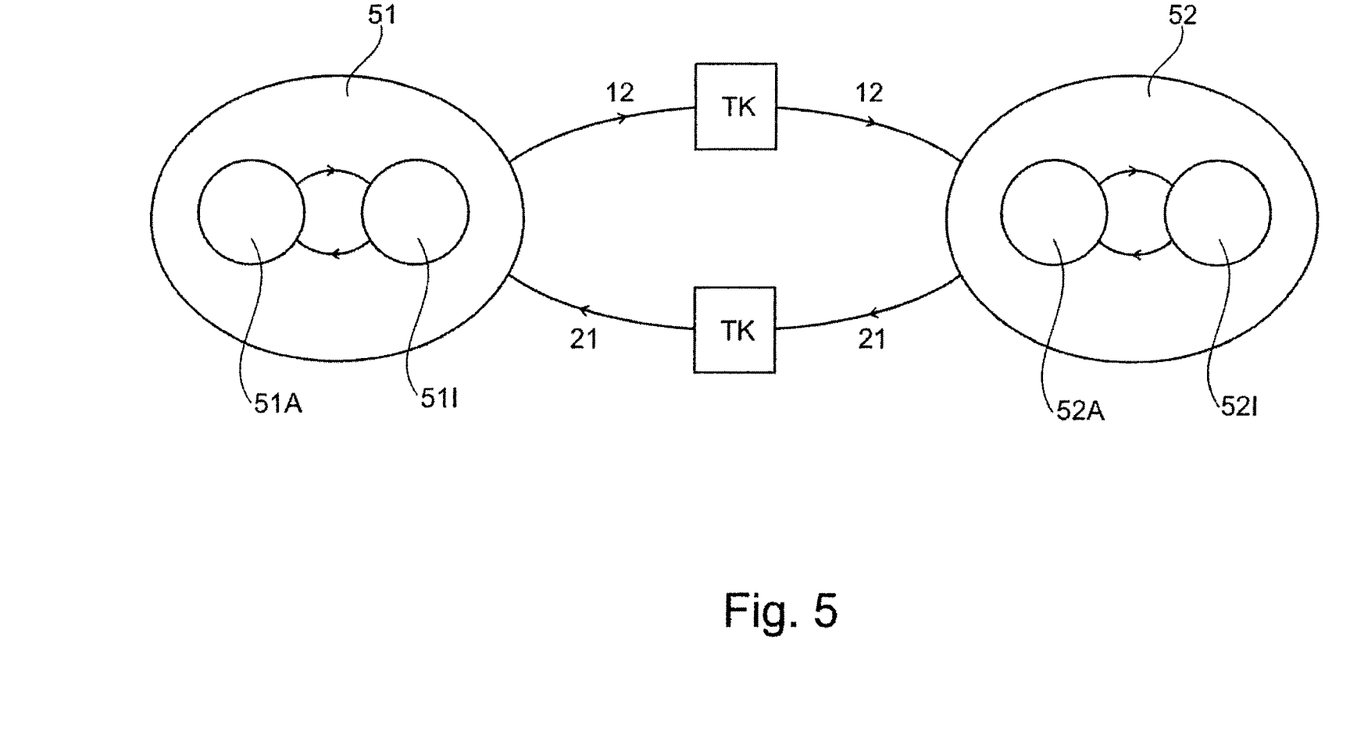
FIG. 5 shows a diagram explaining an embodiment of the method according to the present invention.

During operation, the control system may be basically in two different states: state 51 corresponds to the state when controller C-1 has control over assemblies A-1 and A-2 and state 52 corresponds to the state when controller C-2 has control over assemblies A-1 and A-2; control is represented by "token" TK in FIG. 5. Control TK may pass from controller C-1 to controller C-2 and this corresponds to the state transition 12 in FIG. 5; control TK may pass from controller C-2 to controller C-1 and this corresponds to the state transition 21 in FIG. 5. States 51 and 52 may in turn be divided into two substates: substate 51A corresponds to the state when controller C-1 has control over assemblies A-1 and A-2 and its machine M-1 is active, substate 511 corresponds to the state when controller C-1 has control over assemblies A-1 and A-2 and its machine M-1 is inactive, substate 52A corresponds to the state when controller C-2 has control over assemblies A-1 and A-2 and its machine M-2 is active, substate 521 corresponds to the state when controller C-2 has control over assemblies A-1 and A-2 and its machine M-2 is inactive.

As it will be better understood in the following, control over the assemblies (i.e. the "token" TK) can be freely exchanged between controllers C-1 and C-2 only if they are in the same operating status, i.e. both "active" or both "inactive"; even in this case, a dialog between the controllers is used for passing control. The free exchange is possible as the controllers and the machine are identical or similar and therefore, when the machines are in the same operating status, the common assemblies require an identical or similar control.

Figure 6:
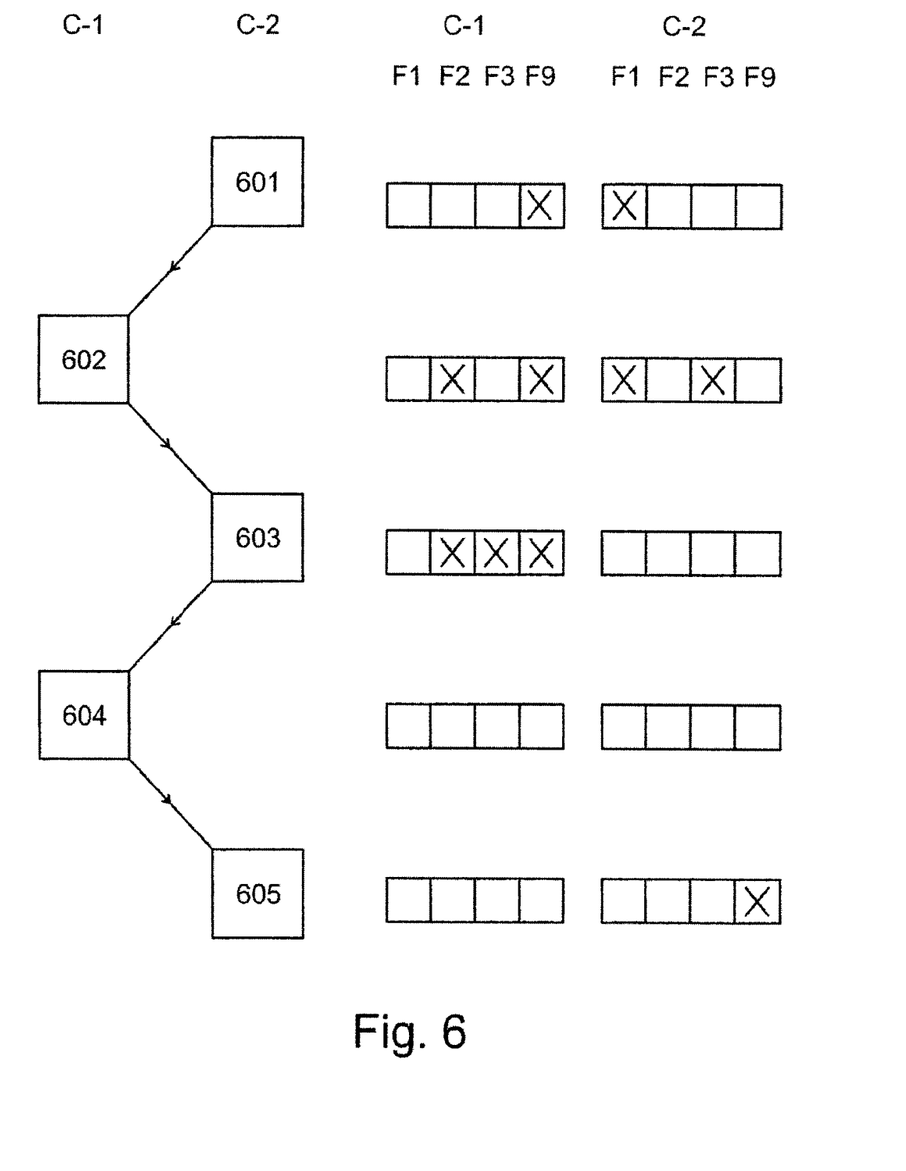
FIG. 6 shows a diagram representing a possible flow of actions and content of registers when a controller wants to get control over an assembly, e

An example of the dialog between controller C-1 and controller C-2 for passing control from controller C-1 to controller C-2 will know be described with the help of FIG. 6. If controller C-2 wants to obtain control over the assemblies from controller C-1, the following steps happens:

step 601: controller C-2 sets field F1 of the register of controller C-2, in this way it notifies its request to obtain control, step 602: if controller C-1 wants to grant the request, controller C-1 sets field F3 of the register of controller C-2 and sets field F2 of the register of controller C-1, in this way it notifies its confirmation, step 603: controller C-2 resets fields F1 and F3 of the register of controller C-2 and sets the field F3 of controller C-1, step 604: controller C-1 resets fields F2, F3 and F9 of the register of controller C-1, step 605: controller C-2 sets field F9 of the register of controller C-2.

If, for any reason known to controller C-1 or to controller C-2, passing of the control is not possible (contrary to the example of FIG. 6), field F4 (not shown in FIG. 6) is set and so the process is stopped and control remains as it was.

The information stored in fields F5, F6, F7 and F8 of the registers of the controllers C-1 and C-2 determine whether passing of the control is possible or has to be denied; as already said, if, for example, field F5 of controller C-1 is equal to field F5 of controller C-2 or if field F6 of controller C-1 is equal to field F6 of controller C-2 control may pass either from controller C-1 to controller C-2 (state transition 12 in FIG. 5) or from controller C-2 to controller C-1 (state transition 21 in FIG. 5).

Figure 7:
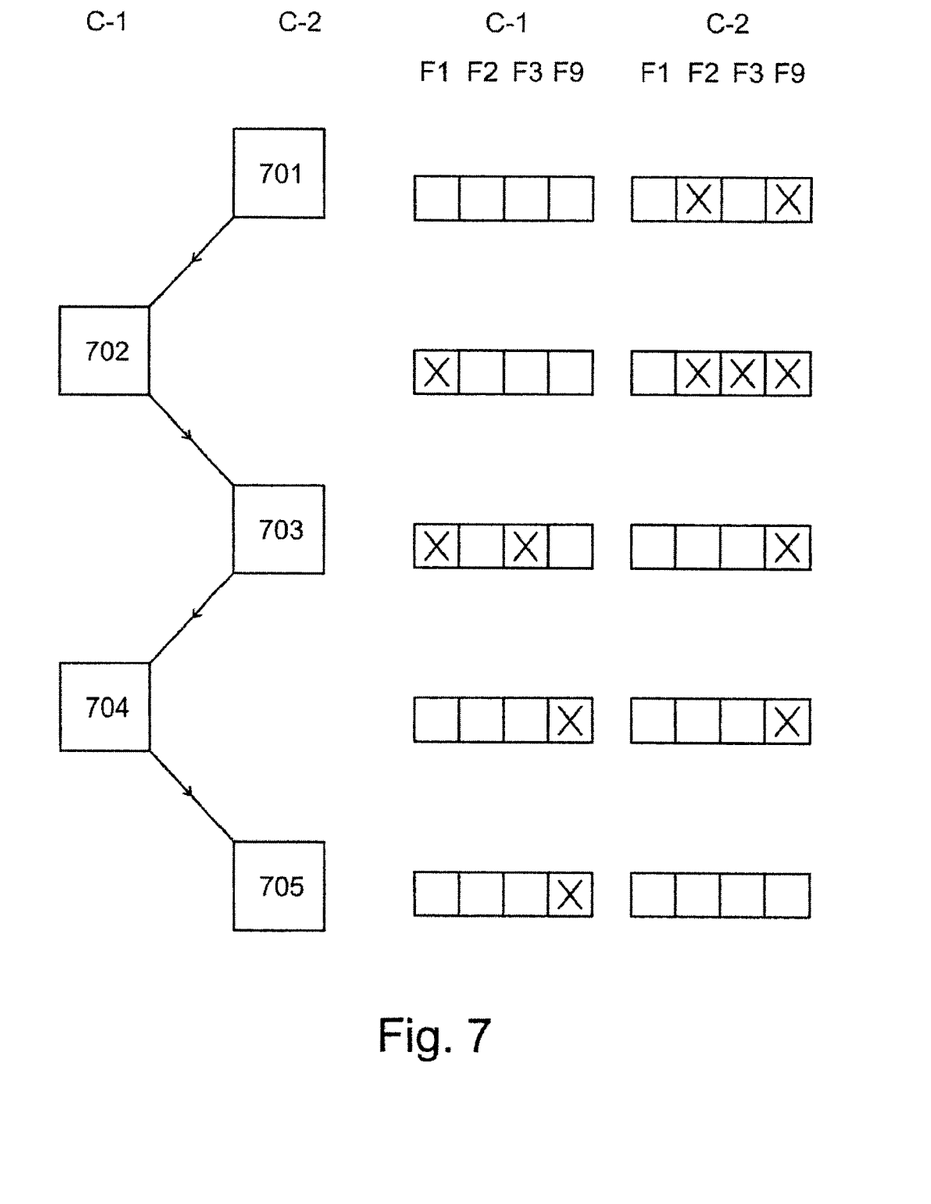
FIG. 7 shows a diagram representing a possible flow of actions and content of registers when a controller wants to release control over an assembly.

Another example of the dialog between controller C-1 and controller C-2 for passing control from controller C-2 to controller C-1 will know be described with the help of FIG. 7. If controller C-2 wants to release control over the assemblies to controller C-1, the following steps happens:

step 701: controller C-2 sets field F2 of the register of controller C-2, in this way it notifies its request to release control, step 702: if controller C-1 wants to grant the request, controller C-1 sets field F3 of the register of controller C-2 and sets field F1 of the register of controller C-1, in this way it notifies its confirmation, step 703: controller C-2 resets fields F2 and F3 of the register of controller C-2 and sets the field F3 of controller C-1, step 704: controller C-1 resets fields F1 and F3 of the register of controller C-1 and sets field F9 of the register of controller C-1, step 705: controller C-2 resets field F9 of the register of controller C-2.

If, for any reason known to controller C-1 or to controller C-2, passing of the control is not possible (contrary to the example of FIG. 7), field F4 (not shown in FIG. 7) is set and so the process is stopped and control remains as it was.

A typical situation when controller e.g. C-2 wants to obtain control over the assemblies is when its machine e.g. M-2 is going to be started i.e. is still "inactive" (field F6); in this case, even if machine e.g. M-1 is "active" (field F5), control may pass as machine e.g. M-2 is "starting" (field F7).

A typical situation when controller e.g. C-2 wants to release control over the assemblies is when its machine e.g. M-2 is going to be stopped i.e. is still "active" (field F5); in this case, only if machine e.g. M-1 is "active" (field F5), control may pass as machine e.g. M-2 is "stopping" (field F8).

From the above explanation and the above two examples it is clear that in the control system of FIG. 2 and FIG. 3 sent and received messages of said dialog between the controllers may depend on the operating status and/or the operating transition of the controllers and therefore on the operating status and/or the operating transition of the machines.

Typically, a controller maintains control over the assemblies unless there is a specific reason of change; for example, with reference to FIG. 2 and FIG. 3, if the control was with controller C-1 and machine M-1 was "active" and then machine M-2 is started and the control passes to controller C-2, controller C-2 will maintain control thereafter unless something happens.

One of the possible reasons a passing of control is a normal change command from a human operator; in this case, a normal dialog between the controllers takes place.

Another of the possible reasons a passing of control is an emergency change command from a human operator; in this case, no dialog between the controllers takes place and one of the controllers starts transmitting control commands to the assemblies via e.g. the communication unit.

It is worth noting that, for security reasons, if communication between controllers is not possible due to a "loss of connection", an emergency procedure is advantageously started; in this case, for example control is maintained by the controller who had control and an alarm signal is generated.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims, or if they include equivalent structural elements with insubstantial differences from the literal language of the claims.

What is claimed is:

1. A method for controlling at least a first machine and a second machine, and at least a first assembly and a second assembly, the method comprising:
controlling a main function of said first machine by at least a first controller;
controlling a main function of said second machine by at least a second controller;
controlling by one of said first and said second controllers, a first auxiliary function of said first assembly provided to said first and said second machines;
controlling by one of said first and said second controllers, a second auxiliary function of said second assembly provided to said first and said second machines; and
maintaining a dialog between said first and said second controllers by:
storing an operating status and operating transition of the first and second machines in both the first and second controllers; and
updating the stored operating status and operating transition of the first and second machines in both the first and second controllers whenever either machine changes an operating status or an operating transition, in order to assure that only one of said first and said second controllers controls said first assembly at a time, wherein, based on said dialog, control of said first assembly and said second assembly is exchanged between said first and second controllers responsive to determining said first controller and said second controller include an active operating status indicating that the first machine and the second machine are in an active operating state.

2. The method of claim 1, further comprising, in case of emergency, issuing control commands by any one of said first and said second controllers to said first assembly despite which one of said first and said second controllers is currently controlling said first assembly.

3. The method of claim 1, wherein said first and said second controllers are associated directly with a communication unit, wherein said communication unit is associated directly with said first assembly, the method further comprising using said communication unit for control of said first assembly by said first and said second controllers.

4. The method of claim 3, further comprising:
receiving by said communication unit repeatedly measurement values from said first assembly; and
providing one or more of said measurement values from said communication unit to any one of said first and said second controllers upon request.

5. The method of claim 3, further comprising:
receiving by said communication unit control commands for said first assembly from any one of said first and said second controllers; and
forwarding said control commands for said first assembly to said first assembly.

6. The method of claim 1, wherein control over said first assembly is exchanged between said first and said second controllers only if the first and said second controllers include an inactive operating status indicating that the first machine and the second machine are in an inactive operating state.

7. The method of claim 1, wherein the at least a first machine and a second machine comprise one or more of pumps, compressors, turbines, and engines.

8. The method of claim 1, wherein the first assembly comprises one or more of active lubrication assemblies, active cooling assemblies, active sealing system.

9. The method of claim 1, comprising using a direct connection between the first and second controller for storing and updating the operating status and operating transition of the first and second machines.

10. The method of claim 9, comprising using an indirect connection between the first and second controller for storing and updating the operating status and operating transition of the first and second machines in the event of a failure of the direct connection.

11. A control system for controlling at least a first machine and a second machine, and at least a first assembly and a second assembly, the control system comprising:
a first controller configured to control a main function of said first machine; and
a second controller configured to control a main function of the second machine, wherein said first and said second controllers are further configured to control a first auxiliary function of said first assembly provided to said first and said second machines and to control a second auxiliary function of said second assembly provided to said first and said second machines, wherein said first and said second controllers are configured with:
  registers for storing an operating status and operating transition of both the first and second machines; and
  an updating routine for updating the stored operating status and operating transition of the first and second machines in both the first and second controllers whenever either machine changes an operating status or an operating transition, in order to maintain a dialog between each other to assure that only one of said first and said second controllers controls said first assembly at a time, and
  wherein, based on said dialog, control of said first assembly and said second assembly is exchanged between said first and second controllers responsive to determining said first controller and said second controller include an active operating status indicating that the first machine and the second machine are in an active operating state.

12. The control system of claim 11, further comprising a communication unit, said first and said second controllers are associated directly with said communication unit, said communication unit is associated directly with said first assembly,
  wherein said communication unit is configured for allowing control of said first assembly by said first and said second controllers.

13. An oil or gas treating and/or distributing plant, comprising:
  at least a first machine and a second machine;
  a first assembly configured to provide a first auxiliary function to said first and said second machines;
  a second assembly configured to provide a second auxiliary function to said first and said second machines; and
  a control system comprising at least a first controller and a second controller, wherein said first and said second controllers are configured to control respectively a main function of said first and said second machines, wherein said first and said second controllers are configured to control the first auxiliary function of said first assembly and to control the second auxiliary function of said second assembly, wherein said first and said second controllers are configured to:
  store an operating status and operating transition of both the first and second machines; and
  update the stored operating status and operating transition of the first and second machines in both the first and second controllers whenever either machine changes an operating status or an operating transition, in order to maintain a dialog between each other to assure that only one of the first and the second controllers controls said first assembly at a time, and
  wherein said first and said second controllers are configured to exchange control of said first assembly and said second assembly responsive to determining said first controller and said second controller include an active operating status indicating that the first machine and the second machine are in an active operating state, based on said dialog.

14. The plant of claim 13, wherein the control system further comprises a communication unit, said first and said second controllers are associated directly with said communication unit, said communication unit is associated directly with said first assembly, wherein said communication unit is configured for allowing control of said first assembly by said first and said second controllers.

15. The plant of claim 13, wherein the at least a first machine and a second machine comprise one or more of pumps, compressors, turbines, and engines.

16. The plant of claim 13, wherein the first assembly comprises one or more of active lubrication assemblies, active cooling assemblies, active sealing system.

17. The plant of claim 13, comprising a direct connection between the first and second controller for storing and updating the operating status and operating transition of the first and second machines.

18. The plant of claim 17, comprising an indirect connection between the first and second controller for storing and updating the operating status and operating transition of the first and second machines in the event of a failure of the direct connection.

* * * * *